United States Patent [19]

Quirk et al.

[11] Patent Number: 5,573,568
[45] Date of Patent: * Nov. 12, 1996

[54] METHOD FOR REDUCING NOX EMISSIONS FROM A REGENERATIVE GLASS FURNACE

[75] Inventors: Richard Quirk, Ormskirk; David A. Bird, Rufford Nr. Ormskirk; Ian N. W. Shulver, Southport; Robin M. McIntosh, Newburgh, all of United Kingdom

[73] Assignee: Pilkington Glass Limited, United Kingdom

[*] Notice: The term of this patent shall not extend beyond the expiration date of Pat. No. 5,569,312.

[21] Appl. No.: 153,990

[22] Filed: Nov. 18, 1993

[30] Foreign Application Priority Data

Nov. 27, 1992 [GB] United Kingdom ............... 9224852
May 25, 1993 [GB] United Kingdom ............... 9310720

[51] Int. Cl.$^6$ ............................................. C03B 5/167
[52] U.S. Cl. .................... 65/134.6; 431/5; 110/210; 110/212; 110/214
[58] Field of Search ........................... 65/134.6, 347, 65/134.4; 423/235, 246, 236, 245.3; 431/10, 5; 110/214, 212, 210, 211

[56] References Cited

U.S. PATENT DOCUMENTS

| | | | |
|---|---|---|---|
| 3,856,496 | 12/1974 | Nesbitt et al. | 65/134.6 |
| 3,873,671 | 3/1975 | Reed et al. | 423/246 |
| 4,328,020 | 4/1982 | Hughes . | |
| 4,347,072 | 8/1982 | Nagaoka et al. | 65/27 |
| 4,372,770 | 2/1983 | Krumwiede | 65/27 |
| 4,528,012 | 7/1985 | Sturgill | 65/134.6 |
| 4,559,100 | 12/1985 | Ninomiya et al. | 156/345 |
| 4,599,100 | 7/1986 | Demarest, Jr. | 65/134.4 |
| 4,878,830 | 11/1989 | Henderson | 431/10 |
| 5,085,156 | 2/1992 | Dykema | 431/10 |
| 5,417,731 | 5/1995 | LeBlanc et al. | 65/134.4 |

FOREIGN PATENT DOCUMENTS

| | | | |
|---|---|---|---|
| 2510423 | 2/1983 | France . | |
| 53-8361 | 1/1978 | Japan | B01D 53/34 |
| 54-029317 | 3/1979 | Japan . | |
| 54-038268 | 3/1979 | Japan . | |
| 55-154327 | 12/1980 | Japan . | |

OTHER PUBLICATIONS

"Furnace Emission Challenge to French Glassmakers," *Glass*, Apr. 1993, pp. 137–140.

*Primary Examiner*—Donald E. Czaja
*Assistant Examiner*—Steven P. Griffin
*Attorney, Agent, or Firm*—Howrey & Simon

[57] ABSTRACT

A method of operating a regenerative glass furnace for melting glass for the manufacture of shaped glass articles so as to minimize emission of NOx in waste gases leaving the furnace, the furnace having sealed regenerators which act as heat exchangers, the method comprising supplying fuel in excess of that required for stoichiometric combustion to ensure that glass of the required quality at the required production rate is obtained, and that the waste gases leaving the furnace through the regenerators contain combustible material, and reacting the combustible material with sufficient air to ensure that the waste gases exiting to atmosphere contain permissible levels of combustible material and contain permissible levels of NOx. Alternatively, the furnace may be operated at substantially stoichiometric conditions and fuel is supplied to waste gases as they leave the melting chamber. The invention also relates to a regenerator glass furnace for use in the method. The invention further provides a method of reducing the emissions of CO in waste gases leaving a cross-fired regenerative glass furnace for melting glass for the manufacture of shaped glass articles, the furnace having sealed regenerators which act as heat exchangers, the method comprising removing CO from the waste gases in the regenerator by combusting CO in around 8% excess air, based on the combustion air for the supplied fuel, at a temperature greater than 650° C.

11 Claims, 3 Drawing Sheets

METHOD FOR REDUCING NOX EMISSIONS FROM A REGENERATIVE GLASS FURNACE

BACKGROUND TO THE INVENTION

1. Field of the Invention

This invention relates to a method of reducing the NOx content in the waste gases leaving the regenerators of a regenerative furnace used for melting glass for the manufacture of shaped glass articles. NOx is a shorthand designation of oxides of nitrogen such as NO and $NO_2$.

2. Discussion of the Prior Art

It has long been known that a fuel burner operating substoichiometrically (i.e. at an air:fuel ratio less than that necessary to effect complete combustion) will produce less NOx than when operating with stoichiometric conditions, and burners designed to operate in that manner are described e.g. in U.S. Pat. No. 4,878,830 which also reviews the prior art in this field. JP-A-53-8361 (Examined 48134/84) describes a method of operating a glass furnace using afterburners, to introduce additional fuel into the furnace in the vicinity of a port, regenerator, heat exchange chamber or flue. U.S. Pat. No. 4,347,072 discusses this specification and points to problems in operating a glass furnace in the manner described in JP-A-53-8361. U.S. Pat. No. 4,347,072 describes an alternative method of operating by supplying hydrocarbons into the waste gases from fuel combustion above the glass melt and then burning this excess fuel in the furnace to provide heat energy to the melting process.

It has always been considered that operating a glass furnace with the melting conditions reducing, i.e. substoichiometric, would produce glass of poor quality.

U.S. Pat. No. 4,559,100 in the name of the major glass maker PPG describes a process where the conditions in the vicinity of the melting glass are prevented from becoming substoichiometric so as to avoid producing poor quality glass. The process requires that additional fuel should be injected into the melting chamber at a flow rate and volume sufficient to provide an $O_2$ rich region above the glass and a fuel rich region thereabove, and to further provide relatively low overall excess air and at least substantially complete combustion by the time the combustion gases exit the melting chamber. Substoichiometric conditions clearly have occurred by chance from time to time in glass tanks and, as they have resulted in poor glass, have directed people away from operating continuously with reducing conditions in the furnace.

We have now found that a reduction in the amount of NOx in the waste gases leaving a flue system of a glass melting tank can be achieved by ensuring that the waste gases leaving the furnace and entering the regenerator includes fuel which has not undergone complete combustion. All of the previous proposals to operate with non-stoichiometric conditions are concerned with the melting chamber, and ensuring that oxidizing conditions are maintained within the melting chamber at all times and where excess fuel is supplied, ensuring that it is burnt before it enters the regenerator system, or that as the fuel passes through the regenerator that conditions are consistently oxidizing. Our invention is based on the discovery that it is possible to minimize the amount of NOx in the exit flue gases from a regenerative glass melting tank by ensuring that there are combustibles present in the waste gases as they pass through the regenerators. This combustible material is a mixture of unburnt fuel, combustible material produced by the effect of heat on the fuel and other radicals produced in this pyrolysis. A part of this material is capable of reacting with NOx in the waste gases and converting it to harmless material. It is essential to operate with a sealed regenerator so that the ingress of air into the regenerators is such as to avoid uncontrolled combustion within the refractory packing or checkerwork structure, which reduces the effectiveness of the process of removal of NOx from the waste gases. In particular, the burners are sealed into the burner block/ port neck refractories of the regenerators. It is ensured that there is no excess air in the checkerwork structure which would cause uncontrolled combustion of the fuel within the checkerwork structure which would damage the structure due to overheating. The combustible material is burnt by adding air preferably after it has left the checkerwork structure of regenerators, or at points within the checkerwork dependent on the temperature regime within the regenerator system.

SUMMARY OF THE INVENTION

According to the invention, there is provided a method of operating a regenerative glass furnace for melting glass for the manufacture of shaped glass articles so as to minimize emission of NOx in waste gases leaving the furnace system, the furnace having sealed regenerators which act as heat exchangers, the method comprising supplying fuel in excess of that required for stoichiometric combustion to ensure that glass of the required quality at the required production rate is obtained, and that the waste gases leaving the furnace through the regenerators contain combustible material, and reacting said combustible material with sufficient air to ensure that the waste gases exiting to atmosphere contain permissible levels of combustible material and contain permissible levels of NOx. Preferably, the regenerators contain checkerwork structures.

The furnace may be an end fired or cross-fired furnace. Examples of shaped glass articles are containers, such as bottles or jars, drinking glasses, tableware, pressed glassware, etc.

One way of per,forming the invention (hereinafter referred to as "Type 1" operation) is to operate with substantially substoichiometric conditions within the melting area of the furnace by supplying excess fuel to the melting area and allowing combustible material to leave the furnace through the sealed regenerators mixed with the waste gases. In another form of the invention (hereinafter referred to as "Type 2", operation) the conditions within the melting furnace are operated with a limited amount of combustion air so as to be substantially stoichiometric and fuel is supplied to the waste gases as they leave the melting area and enter the sealed regenerator structure. In such an arrangement, either excess air or excess fuel may be present in the melting furnace. This post furnace fuel is added by the existing burners or through additional separate fuel "burners" in the port mouth region. In both cases, air is added to the waste gases as they leave the checkerwork structure of the regenerators so as to remove substantially all the combustible material by burning it with the added air.

In a typical gas-fired glass melting furnace, the melting operation is carried out with around 5% excess air which typically produces a NOx content in the chimney exhaust gases of around 2500 $mg/m^3$. In this specification, references to concentrations (e.g. $mg/m^3$) are at TALuft conditions, i.e. at 8% $O_2$ measured dry, in a dry waste gas volume and NOx emissions are expressed as $NO_2$ emissions. Volumetric measurements are all specified at 760 mmHg and 0° C., and parts per million (ppm) are specified in volumetric terms. We have found that operating with reduced amounts of excess air than in known furnaces, i.e. using stoichiometric or substoichiometric conditions, not only is less NOx generated within the melting chamber but the residual fuel reduces NOx present to $N_2$ in the regenerators. This double effect causes a significant reduction in the amount of NOx released in the chimney exhaust gases. The present invention can achieve NOx chimney emissions of less than 500 mg/m$^3$.

We have found that despite the previous belief that operating a glass furnace or tank under substantially reducing conditions would result in poor quality glass, it is possible to operate with the amounts of fuel and combustion air supplied to the tank being such that the reaction conditions are substantially substoichiometric without adverse effects. We believe that this is only possible when there is very careful control of the stoichiometry within the furnace and where the substoichiometric conditions are produced by the use of excess fuel rather than insufficient air, or else insufficient energy is supplied to the melting process, and glass quality and/or production rate deteriorates. It is preferable to not only monitor the oxygen content at the exit port mouth, but also the quantity of unburnt combustible material at this position. It is necessary to ensure when the conditions in the furnace are substantially substoichiometric that sufficient fuel is being burnt to provide the quantity of heat needed to produce molten glass at a satisfactory rate, and quality.

In a further aspect of our invention, there is provided a method of reducing a NOx content in waste gases generated by the combustion of fuel, in a regenerative furnace for melting glass for the manufacture of shaped glass articles, the furnace having a melting chamber and sealed, regenerators, the method comprising measuring the combustibles and oxygen in the gases at at least one point, in the melting chamber and regulating the supply of fuel and combustion air in response to such measurements to ensure that within the melting chamber, the average stoichiometry is substantially below that required to effect complete combustion while ensuring that the part of the fuel actually combusted is not less than that dictated by the heat input requirements of the melting and refining processes which occur in the melting chamber and supplying additional combustion air to the waste gases after they have left the melting chamber (sometimes referred to as a melting and refining chamber) and before they exit to atmosphere to ensure substantially complete combustion of any combustibles remaining in the waste gases.

The furnace may be end-fired or cross-fired. The preferred end-fired furnace has a pair of ports along an end of the melting and refining chamber, and a pair of the sealed regenerators each of which communicates with a respective one of the ports.

The end fired furnace used in the preferred method of the present invention is typically used to make molten glass for the production of containers.

The present invention may measure oxygen as well as the combustibles in the gases. The measurement may be carried out on the waste gases leaving the melting and refining chamber for example at the port mouth.

As indicated above, another method of ensuring that combustible material passes through the regenerators with the waste gases is by supplying fuel to the waste gases as they leave through the port neck of the furnace. This can, be done by placing fuel supply means at after burner positions. After burners may be placed in the path of the exiting waste gases. The fuel can be directed into the waste gases in the same direction of flow, or counter flow. After burners can be a separate means of supplying fuel into the waste gas stream, or the non-firing burners on the waste gas exit side of the furnace can be used to introduce fuel into the waste gas stream. The conditions within the melting chamber are preferably maintained at or below stoichiometric, so as to avoid combusting more fuel than is needed for the NOx reduction process.

Secondary air is introduced at positions within the regenerator/flue system where temperatures allow ignition of the combustible species to complete combustion and ensure that gases exiting to atmosphere are substantially free of combustible materials. It is essential that the regenerator system is substantially sealed against the ingress of air, so that the introduction of secondary air can be controlled and combustion primarily only takes place outside the regenerator packing/checkerwork.

The quantity of combustible material and oxygen present at the exit port mouth can be measured in situ, or by extractive analysis using available instruments. Such instruments can include a zirconia probe to measure oxygen and a catalytic cell to measure combustibles. The Teledyne 980 gas analyzer is satisfactory for this purpose. NOx can be measured using a Lancom 6500 portable flue gas analyzer or a Signal chemiluminescence analyzer.

The present invention further provides a method of reducing the emissions of CO in waste gases leaving a regenerative glass furnace for melting glass for the manufacture of shaped glass articles, the furnace having sealed regenerators which act as heat exchangers, the method comprising removing CO from the waste gases in the regenerator by combusting CO in around 8% excess air, based on the combustion air for the supplied fuel, at a temperature greater than 650° C.

The present invention still further provides a regenerative glass furnace for melting glass for the manufacture of shaped glass articles, the furnace having sealed regenerators which contain checkerwork structures which act as heat exchangers, the furnace further having apparatus for reducing the emission of NOx in waste gases leaving the furnace, the apparatus comprising means for supplying additional fuel into the waste gases as they leave the melting chamber of the furnace whereby the NOx emissions in the chimney waste gases are reduced to less than 500 mg/m$^3$ measured under TALuft conditions.

An embodiment of the present invention will now be described by way of example only with reference to the accompanying drawings, in which:

DESCRIPTION OF THE PREFERRED EMBODIMENTS

Figure 1:
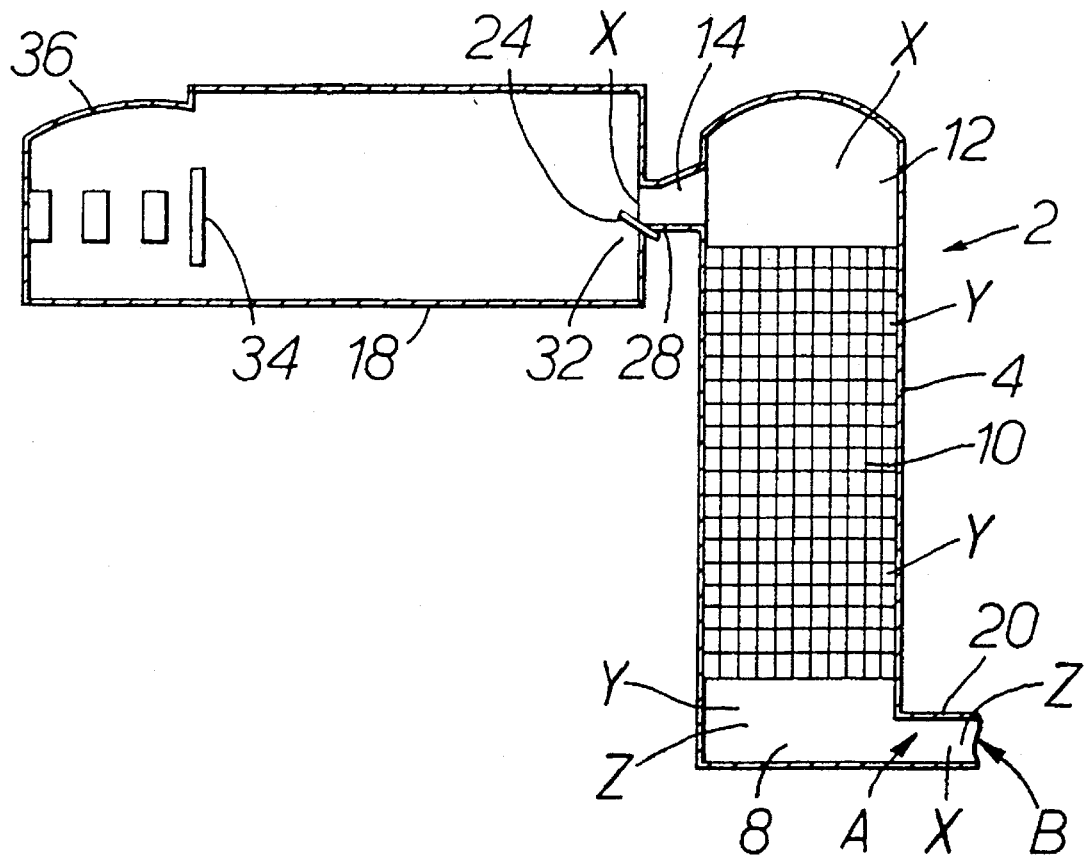
FIG. 1 is a diagrammatic cross-section of an end fired regenerative furnace.
Figure 2:
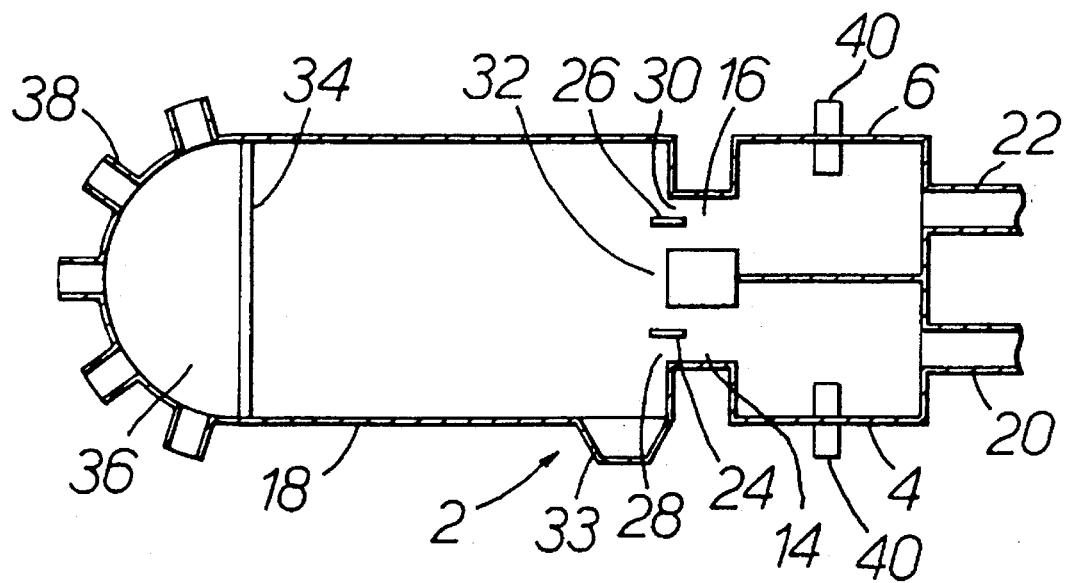
FIG. 2 is a diagrammatic transverse sectional plan of the furnace shown in FIG. 1.

FIGS. 1 and 2 show a regenerative glass melting furnace 2 which is end-fired and is typically employed for the melting of glass to be used to manufacture containers.

However, a cross-fired furnace may alternatively be employed. The cross-fired furnace may be a multi-port furnace.

The furnace 2 of the illustrated embodiment is an end-fired furnace which incorporates a pair of sealed, regenerators 4,6 disposed side-by-side. The regenerators 4,6 may be provided with openable access holes to permit inspection, introduction of air for burnout of combustibles, measuring instruments, etc. . Each regenerator 4,6 has a lower chamber 8, a refractory checkerwork structure 10 above the lower chamber 8 and an upper chamber 12 above the checkerwork structure 10. Each regenerator 4,6 has a respective port 14,16 connecting the respective upper chamber 12 with a melting and refining chamber 18 of the furnace 2 and a respective combustion air inlet 20,22 connecting with the respective lower chamber 8 of the regenerator 4,6. The combustion air inlets 20,22, as well as being communicable with a source of combustion air, are also arranged to be communicated with a chimney (not shown) for the exhaust gases. One or more burners 24,26, only one of each of which is shown, is located in a neck portion 28,30 of the respective port 14,16. The burners 24,26 are arranged to burn fuel, such as natural gas, liquid petroleum gas, fuel oil or other gaseous or liquid fuels which are suitable for use in a glass melting furnace and thereby supply heat for melting and refining the glass making materials in the chamber 18. The melting and refining chamber 18 is fed with glass making materials at one end 32 thereof at which is located a doghouse 33 and has disposed at the other end 34 thereof a molten glass distributor 36 which comprises a series of ports 38 through which molten glass may be removed from the melting and refining chamber 18. The glass may pass from the melting/refining chamber to the distributor 36 through a throat.

In operation, the regenerators 4,6 are cycled alternately between combustion air and exhaust cycles. Thus for example, in one cycle, combustion air passes through the inlet 20 and into the lower chamber 8 of the regenerator 4. The combustion air then passes up through the checkerwork structure 10 of the regenerator 4 where it is preheated and then the combustion air passes through the upper chamber 12, through the port 14 and through the neck 28 where the combustion air is fed into the melting and refining chamber 18. The burner 24 is operated. The exhaust gases from the melting and refining chamber 18 pass through the port 16 of the other regenerator 6 and down through that other regenerator 6 where the exhaust gases are removed through the conduit 22. The gas flows are in the opposite direction in the next cycle and the burner 26 is operated instead of the burner 24.

The burners 24,26 may be mounted in a number of possible configurations, for example a through-port configuration, a side-port configuration or an under-port configuration. Fuel, e.g. natural gas, is fed from the burner 24 (which in the present embodiment are under-port burners) into the incoming stream of pre-heated air coming from the regenerator 4 during the firing cycle, and the resultant flame and products of combustion produced in that flame pass from the port 14 across the surface of the melting glass, and transfer heat to that glass in the melting and refining chamber 18.

Means to measure both combustibles and oxygen in the gases leaving the melting and refining chamber 18 at each port mouth, and at the exits from the regenerators 4,6 as well as at the base of the chimney are provided. Measuring points along the path Of the waste gas are indicated by x in FIG. 1. The melting furnace 2 is operated in a manner which means that uncombusted/partly combusted/pyrolysed material enters the regenerator on the exhaust side of the furnace so that means to add additional air to the waste gases after they leave the melting and refining chamber 18 are required to ensure substantially complete combustion has taken place and no or very little combustible material passes to the atmosphere through the chimney. Air may be added deliberately through holes in the flue or air may enter by natural inleakage which may be around 10% of the total furnace requirement of air. Additional air may be supplied at y in FIG. 1. Final combustion of any remaining combustibles is then caused to take place at the points indicated by z. About 70% of the combustible material in the waste gases is carbon monoxide with the remainder being mainly hydrogen.

In operating the glass melting furnace shown in FIGS. 1 and 2 in accordance with one embodiment of the present invention (i.e. Type 1 operation), the fuel fed to the burners and the combustion air supplied is controlled by measuring at the port mouth and the top of the checkerwork structure (the countertop) the quantity of oxygen and combustible material present so as to ensure that within the melting Chamber or at points along the melting chamber, the combustion air fed is less than that required for complete combustion of the fuel being supplied. It is normal to express any supply of combustion air which is greater than the stoichiometric air requirement of the fuel supplied as a percentage excess air, and in this situation this is a positive term. In the present instance where the amount of air is less than that required for complete combustion, for ease of control, we represent this in the same manner but as a negative term. This means that the changes in the amount of excess air can be monitored and reported in the same manner whether or not the amount of air fed is greater or less than that required for complete combustion. In one embodiment of the present invention, the fuel fed at each port and the amount of combustion air is regulated in accordance with the measurements made so that the quantity of excess air in the melting chamber of the furnace lies in the range of from −3% to −10% of stoichiometric combustion air, more preferably −8% to −10% of combustion air. For a multi-port furnace preferably the quantity of excess air from port to port rises from −15% at the first port to 0% at the last port. The quantity of air fed to the intervening ports between the first port and the last port, can be at the same level of −15%, or can fall in the stages to give an average of −9%.

Figure 3:
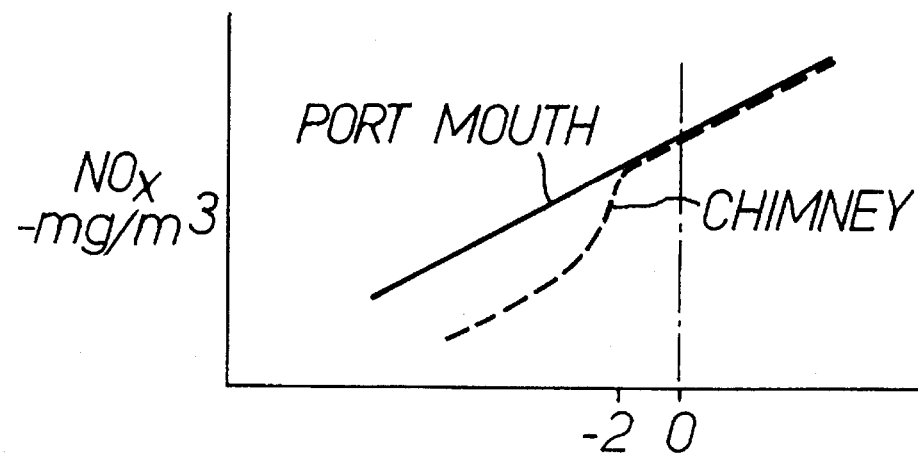
FIGS. 3 to 7 are graphs showing the variation of species in the waste gases, such as NOx and CO, with various operating parameters when employing the method and apparatus of the present invention.

FIG. 3 shows how the NOx emissions are related to the excess air level at the port mouths in the furnace. The solid line represents the NOx concentration at the port mouth and the dashed line represents the NOx concentration in the chimney. It will be seen that at low amounts, below −2%, of excess air at the port mouth, the NOx concentration in the chimney is reduced relative to that in the port mouth and this indicates that NOx reduction has occurred in the regenerator, between the port mouth and the chimney. The de-NOx reaction has occured primarily in the checkerwork structure as a result of the excess fuel reducing the NOx species therein. The negative excess air value is equivalent to a correspondingly positive excess fuel value. For Type 1 operation, there should be a deficiency of air of at most −3% relative to stoichiometric, i.e. at most about −3% excess air, at the port mouth for initiation of the de-NOx reaction, this leading to around at most −3% excess air at the (the top of the checkerwork structure) which results in excess fuel in the checkerwork structure causing reduction of the NOx therein. At greater amounts of negative excess air, i.e. at greater deficiencies of air, we have found that some deNOx occurs in the upper chamber of the regenerator.

We have found for a multi-port furnace that as long as the last port is maintained at less reducing/more oxidizing conditions than the previous port there is no adverse effect on glass quality. The value chosen for the excess air level is related not only to the required emission limits of NOx but to the thermal penalty due to uncombusted material leaving the melting chamber and will vary with the configuration of the melting furnace being operated and the local requirements with regard to emissions. In some cases, it may well be possible to operate with excess air levels maintained on the upstream ports at the order of −4%, rising to about −1 to 0% at the last port. The monitoring on a regular basis of the waste gases (both oxygen and combustibles) enables the feed of both fuel and combustion air to be adjusted when necessary so as to maintain a tight control on the excess: air at each port mouth thus avoiding any unacceptable increase in NOx emission or deterioration in glass quality. Optimum air and fuel levels for each port need to be established for each port in order to achieve the target emissions. This is because the precise amounts would depend on the particular characteristics of each port. For port by port optimization the NOx concentrations are measured at the bridging flue, with checks at the chimney using portable measuring equipment.

In Type 2 operation, the melting furnace is operated at substantially stoichiometric conditions, i.e. at around 0% excess air, and excess fuel is added to the waste gases outside the furnace chamber.. This is a post-furnace combustion fuel addition. The fuel may conveniently be added by the burners on the non-firing side. For efficiency and checkerwork safety, post furnace fuel should only be added when the port mouth excess air is close stoichiometric, or more ideally substoichiometric. As a result of excess air is present in the waste gases at the port mouth, some of the added fuel will be consumed causing the temperature of the waste gases in the upper chamber and checkerwork structure to rise, with a consequent increase in checkerwork temperature.

Figure 4:
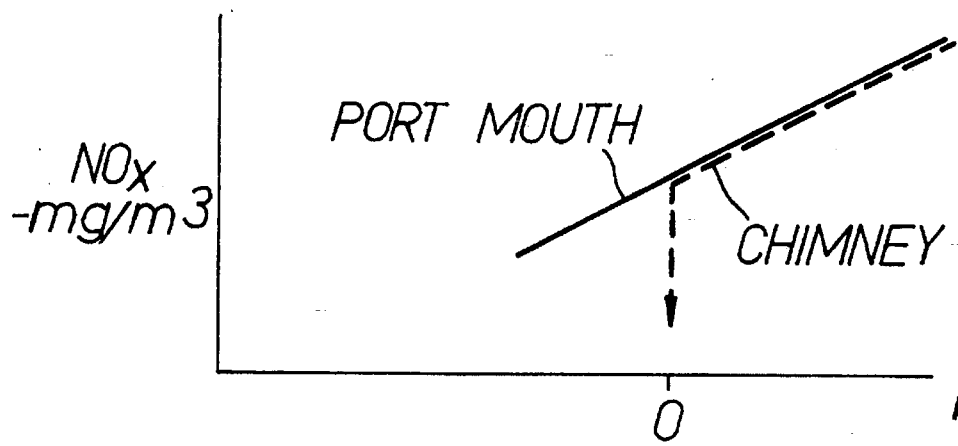

FIG. 4 shows the relationship between NOx concentration at the port mouth (the solid line) and the chimney (the dashed line) and the excess air at the port mouth. It will be seen that working at stoichiometric conditions, the NOx concentration in the chimney can be reduced by adding increasing amounts of post combustion fuel which causes NOx reduction to occur in the checkerwork structure resulting in reduced NOx concentrations in the chimney gases. In order to initiate the de-NOx reaction over the regenerators, at least 3% excess fuel, as a percentage of the primary fuel addition, is added, and preferably around 8 to 10% excess fuel is added. The advantage of the Type 2 operation is that no substantial alterations to the glass furnace are required, apart from the provision of additional equipment to inject the added fuel on the non-firing side. In addition, the Type 2 operation is generally suitable for glasses where it is not appropriate to work at substoichiometric conditions in the melting tank.

Figure 5:
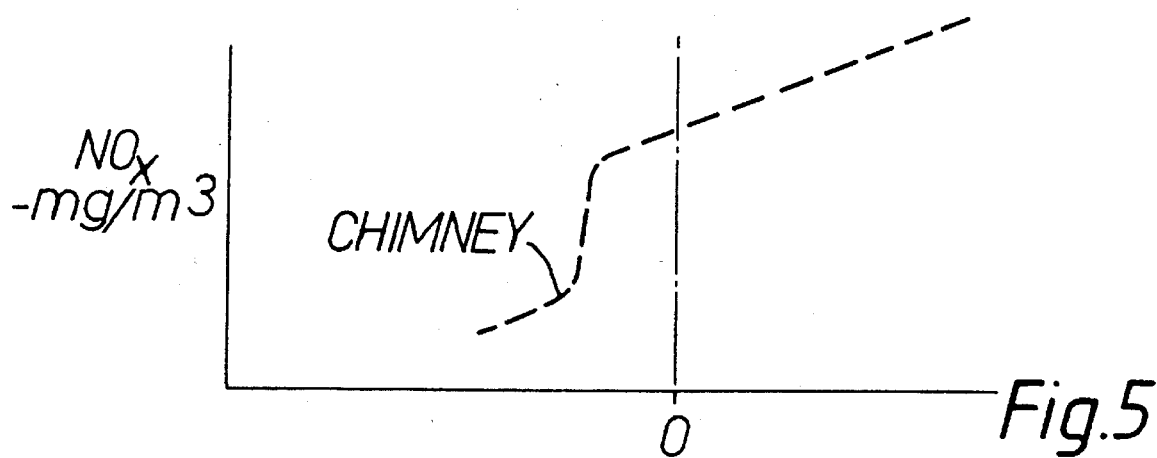

It is also possible to operate the furnace to achieve NOx reduction by using hybrid Type 1 and Type 2 conditions. In such operation, the furnace is operated at substoichiometric conditions with, for example at most −2% excess air at the exit port mouth, and excess fuel, for example, at least 3% excess fuel, is injected into the waste gases on the non-firing side. FIG. 5 shows the relationship between the NOx concentration in the chimney flue with respect to excess air at the (the top of the checkerwork structure) with a fuel addition on the non-firing side. It will be seen that at around −2% excess air and with a fuel addition the NOx concentration is greatly reduced.

In another embodiment of the present invention, the glass melting furnace is of the kind in which the thermal firing of the furnace is reduced by providing heat by electro-thermal means within the furnace.

In both Type 1 and Type 2 operation, and also in the hybrid Type 1/2 operation, the increased levels of raw fuel input required to reduce NOx are typically 5 to 15% in excess of that normally used to produce glass at the desire rate and quality.

To minimize the financial penalty from the increase in fuel required in the glass melting furnace, to reduce we can operate in such a way as to offset the increased fuel costs, by improving the overall thermal efficiency of the glass melting furnace by, for example, adding steam to the combustion air being supplied to the furnace.

The addition of steam typically at a level of about 6%, by volume, of the stoichiometric volume of air supplied to the furnace for combustion, (all volumes normalize to 0° C., 760 mm Hg) can improve the thermal efficiency of the glass melting furnace by 5%. Air preheat is enhanced by increasing the radiative heat transfer between the checkerwork and, more importantly, the upper chamber of the regenerator structure by increasing the quantity of the gaseous species present in the combustion air which are receptive to radiant heat.

The increase in the available heat content of the waste gases, which is derived from the 5 to 15% increase in fuel burnt on the furnace required for reducing NOx can be used directly to generate Steam for this or other purposes.

The effect of the de-NOx operations in accordance with the present invention on furnace operation and on other emissions was also investigated. The addition of post-furnace fuel did not have any long term effect on the $SO_2$ emission from the furnace and no traces of $H_2S$, HCN or $NH_3$ were found in the waste gases measured at the chimney.

In addition, the addition of post-furnace fuel did not affect the composition of the dust recovered from the electrostatic precipitator connected to the chimney flue.

The present inventors also monitored the carbon monoxide emissions from the chimney of the glass melting furnace. Using sealed regenerators which supplied little inleakage of air into the upper chamber or the checkerwork structures and with the furnace operated stoichiometrically or substoichiometrically, some of the fuel added at the port mouth will still be present at the rider arch of the furnace i.e. downstream of the regenerator, as unburnt gases. The unburnt gases need to be burnt before being emitted from the chimney and the unburnt gases are a complex mixture of species, of which typically about 70% is present as carbon monoxide with the remainder being primarily hydrogen. In addition, the added fuel could produce up to 30% or more combustibles, as carbon monoxide, than will be expected from its simple breakdown by combustion. It is necessary for sufficient air to be added to the waste gases downstream of the checkerwork structure in order for complete combustion to occur so as to oxidize the carbon monoxide and other combustibles. Such air may be present as a result of natural inleakage or it may be added to the waste gases downstream of the checkerwork structure. It is necessary, once sufficient air is present, for the temperature to be high enough for oxidation to occur at a reasonable rate. The burning of carbon monoxide and other combustible species in the regenerator base and flues is accompanied by the release of heat giving increased waste gas temperatures, assuming that inleakage of cold air is not excessive. By way of illustration and example, the present inventors discovered that carbon monoxide emissions in the chimney gases were reduced to or below normal levels provided that the temperature in the regenerator base and flue areas was above about 650° C. and there was sufficient air present to complete combustion of the combustibles. The present inventors have surprisingly found that provided that the temperature in the regenerator base and flue areas was above 65020 C., the de-CO reaction was initiated and then proceeded in the central flue of the furnace which has a long residence time of gases therein which ensures complete CO removal. Acceptably low CO levels in the chimney emissions could be achieved by using a burner or burners to for supplying heated air in the regenerator base which raised the temperatures towards around 700° C. It was found that simple addition of extra unheated air at the rider arch, or even at positions higher up the checkerwork, was not sufficient to achieve effective carbon monoxide burnout in the lower regenerator chamber and bridging flues because the temperatures were too low, i.e. below the threshold value of around 650° C. When the furnace was operated with post furnace fuel on all ports, low CO levels, of around 180 ppm in the chimney, were achieved due to vigorous combustion taking place in the main flue ensuring that all the waste gases reach the critical temperature of around 650° C., as the indicated main flue temperature rose to 680° C. Such higher flue temperatures can readily be accommodated in the melting furnace provided that the main flue refractory lining has a temperature design limit greater than that achieved by the CO combustion in the main flue. Furthermore, if a waste heat boiler is provided in the chimney flue, the pre-set boiler inlet temperature may need to be raised or the boiler inlet may need to be bypassed so that the heat capacity of the boiler is not exceeded. Furthermore, it may be necessary to cool the waste gases prior to their being passed through the pollution treatment plant and the electrostatic precipitator. This may be achieved by water sprays and/or extra air dilution. In order to ensure sufficient air for complete combustion of the CO in the regenerator base and flue areas, deliberate inleaking of air at a suitable position can be provided.

Figure 6:
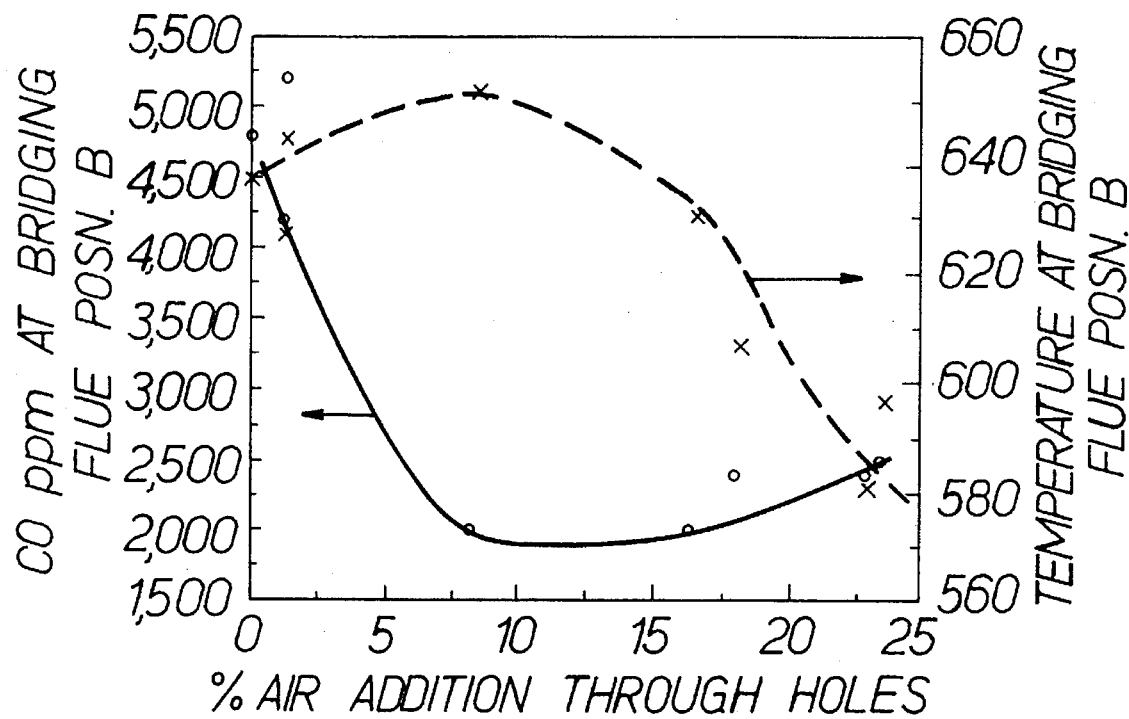

The present inventors have determined that the ideal position in the regenerator system to achieve burnout of CO and of other combustibles, is in the lower chamber below the rider arch. The present inventors have determined that maximum CO burnout occurred at around 8% inleaked air which reduced the CO level down to about 2000 ppm. FIG. 6 shows the relationship between the CO level with respect to air addition (the solid line) and between the temperature and the air addition (the dashed line), at the second port rider arch of the furnace shown in FIGS. 1 and 2, the CO level and the temperature being measured at substantially the center of the bridging flue at position B. Prior to inleakage of air, there was about 3 to 6%. of unburnt gases at the rider arch and the temperature of the waste gases was less than 650° C. so that the temperature and oxygen content were too low to initiate CO removal. Air leakage was permitted into the lower chamber at port 2 through the cleanout holes just above the rider arch level and this reduced the concentration of CO at the rider arch which was about 25000–30000 ppm, with about 5000 ppm CO at the bridging flue position B, to around 2000 ppm at the bridging flue position B. As may be seen from FIG. 6, an increase in the inleaking air increased the burnout of the CO until maximum de-CO occured at about 8% air addition, yielding a CO amount of around 2000 ppm. Above this level of air inleakage, further carbon monoxide burnout was not achieved. With increasing air addition, the temperature increased to a maximum of around 650° C., also at a percentage air addition of about 8%. The waste gas temperatures rose up to about this percentage inleakage value but then gradually dropped with higher levels of inleakage. This shows that above a certain inleakage level, the inleakage effectively cooled the waste gases, inhibiting the oxidation of CO. Visual inspection of the flue showed pale blue wispy flames, indicating CO oxidation, originating at or just below the rider arches and continuing to the flue and at the clean out hole where the inleaked air met the waste gases. The results shown in FIG. 6 indicate that effective carbon monoxide burnout can be achieved at inleakage air values of around 8% and at a temperature above about 650° C.

In order to achieve improved carbon monoxide burnout, the temperature of the air/CO mix was increased beneath the rider arch by addition of heat at that point. The temperature may also be increased by moving the flue dampers in the regenerator system. A natural gas-fired high excess air burner, capable of supplying air at a temperature of up to 900° C., was located, in this Example, only on one port of the furnace. This burner supplied air at above about 800° C. and at a rate of approximately 50 m$^3$/hour of burner gas, equivalent to about 6% of the port fuel. The temperature of the waste gases was raised by about 20° to 30° C. This enabled a level of CO of less than 300 mg/m$^3$ to be achieved at the bridging flue position B as shown in FIG. 1 because of increased CO removal.

Figure 7:
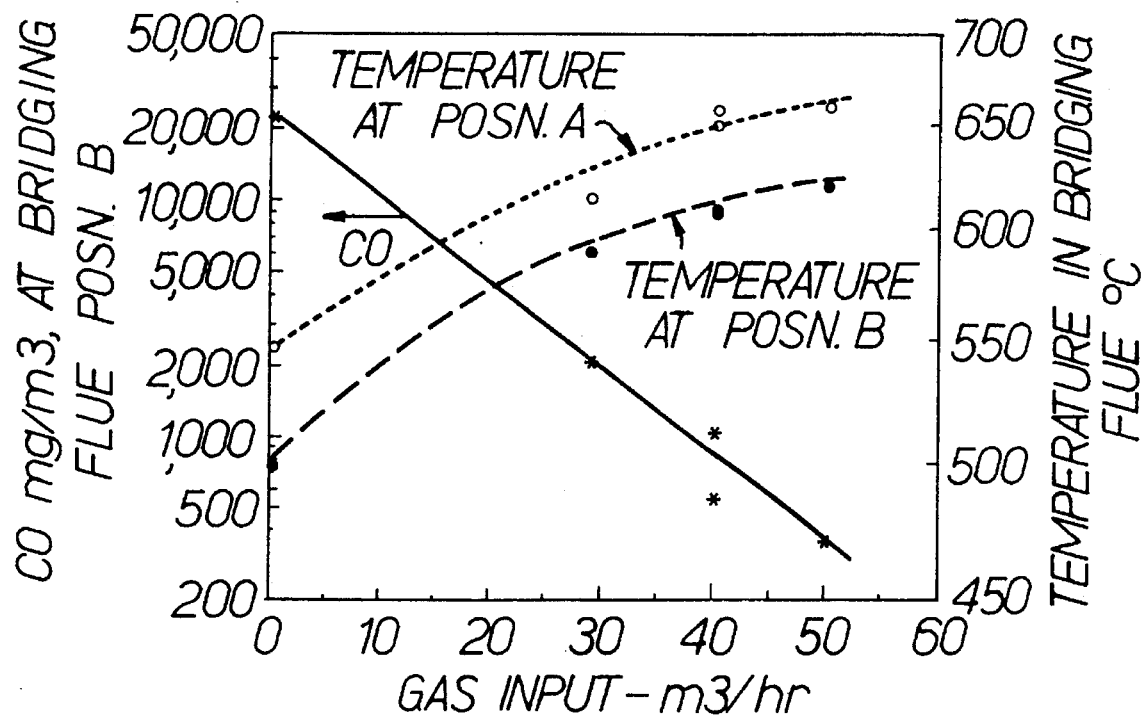

FIG. 7 illustrates the relationship between the CO amount and the natural gas input of the burner (the solid line) and the relationship between the temperature in the bridging positions A and B (the dashed lines) with the natural gas input. It will be seen that as the gas input of the burner increases, the temperature at positions A and B respectively increase and the CO concentration rapidly decreases. In addition, as the gas input increases, the excess air below the rider arch also increases because the burner is supplying heated air. It will be seen at position A that at a temperature of around 650° C. the CO level is reduced to around 800 mg/m$^3$.

In Type 2 operation of the method of the present invention, when post furnace fuel is added to the ports, an increase in the waste gas temperatures was detected and this was accompanied by the existence of flames at the rider arch indicating spontaneous combustion with the excess, but naturally inleaking, air. Such combustion can cause some oxidation of the carbon monoxide present in the combustion products. When the waste gas temperature in the main flue achieved a temperature greater than 650° C., extremely good de-CO was achieved and it was noted that combustion was continuing in the main flue past the measuring point. With natural inleakage of air, the amount of CO in the main flue was around 500 ppm, which was reduced to around 180 ppm of CO in the chimney. This may be compared to an original chimney concentration of CO of 250 ppm under normal operational conditions. Thus the method of the present invention can also obtain a reduction in CO emissions from a glass melting furnace.

It is believed that the oxidative removal of CO at relatively low temperatures of around 650° C. and above is assisted by the presence of $H_2O$ in the waste gases which is a combustion product of the fuel burnt, particularly when the fuel is methane. It is believed that the presence of $H_2O$ in the gases lowers the temperature at which the CO oxidation can occur and the temperature at which maximum CO oxidation can occur.

The present invention can provide significant technical advantages in substantially reducing NOx emissions from glass furnaces for manufacturing shaped glass articles to less than 500 mg/m$^3$, without significant changes to the furnace operation and structure and without negatively affecting glass quality. Other emissions are readily controlled, e.g. the emission of CO can be controlled down to less than 300 mg/m$^3$ and dust recycling and electrostatic precipitation are not affected. There is a reduction in thermal efficiency because of the increased fuel requirement of up to 15% in order to maintain the quality and production rate of the glass but with reduced NOx emissions. However, because no expensive de-NOx catalytic systems are employed, the method of the present invention can readily and cost-effectively be incorporated into existing glass melting furnaces. The present invention can therefore present a lower capital and lower operating cost alternative to other NOx control techniques, such as selective catalytic reduction (SCR), selective non-catalytic reduction (SNCR) and oxy-fuel techniques in the prior art.

The present invention is further illustrated with reference to the following non-limiting examples.

EXAMPLE 1

An end-fired regenerative furnace having a "horseshoe" configuration similar to that shown in FIGS. 1 and 2 and having sealed triple pass regenerators whilst operating at an output of 75 metric tons of molten glass per day. The starting material including 55% by weight of glass cullet and the burners were underport burners and were supplied with heavy fuel oil. The furnace produced glass for quality pressed wear at a melting rate of 2 metric tons/m$^2$/day. In operation of this furnace, the waste gas temperature at the port mouth averaged 1430° C. The amount of excess air at the exit port mouth was +15%, providing levels of NOx of 1000 mg/m$^3$ in the exhaust gases.

In accordance with the Example, the combustion was modified so that the excess air level at the exit port mouth fell to −5%. This caused the level of NOx in the exhaust gas at the chimney base to fall to 250 mg/m$^3$. Thus the present invention enables a reduction of NOx in the exhaust gases of around 75% by operating the furnace at substoichiometric conditions.

EXAMPLE 2

A regenerative furnace having a construction similar to that of Example 1 was operated with excess air levels at the exit port mouth of around −7% and this produced levels of NOx at the chimney base of around 275 mg/m$^3$. Commercial propane gas was introduced counter-flow to the waste gas stream via water cooled through port burners. The flow of propane gas was equivalent to about 15% of the thermal input to the furnace for the melting process. The levels of NOx at the chimney base were measured and were found to be reduced to about 100 mg/m$^3$.

In this specification the amounts of excess air and the amounts of NOx are normalised to 0° C. and 760 mmHg. In Examples 1 and 2, the NOx concentration is expressed as the equivalent mass of NO$_2$ in the wet waste gases, although for Example 3 the equivalent mass is of NO$_2$ in dry waste gases. The volume is also normalised to 8% oxygen content calculated for a dry sample.

EXAMPLE 3

This NOx reduction technology was applied to a four port cross fired furnace producing container-ware. A clear soda lime silica glass was melted to produce bottles and jars. The furnace was fired with heavy fuel oil through underport burners. Electric boost was installed, and the level of boost used averaged about 650 kW. The results are summarized in the following table. NOx emissions were reduced by the application of after burners, from an initial level of 1785 mg/m$^3$ to less than 500 mg/m$^3$. The fuel oil flow to the furnace averaged about 1550 l/hr.

| | | RESULTS WITH NOx REDUCTION TECHNOLOGY | | |
| --- | --- | --- | --- | --- |
| | Original Conditions | After conditioning to near stoichiometric | With post furnace fuel via after burners | With high excess air burner in regenerator base |
| Load tons/day | 300 | 316 | 327 | 327 |
| After burner gas | | | | |
| m/hr | 0 | 0 | 120 | 120 |
| % | — | — | 8.6 | 8.6 |
| Excess air burner fueld - % | — | — | — | 4.0 |
| Combustion conditions | | | | |
| Excess air % | 24 | ~0 | ~0 | ~0 |
| NOx mg/m$^3$ @ 8% O$_2$ | 1785 | 1300 | 1175 | 1175 |
| Chimney | | | | |
| % O$_2$ | 10.0 | 7.7 | 7.0 | 7.1 |
| ppm CO | 10 | 1225 | 1830 | 165 |
| Excess air % | 90 | 57 | 49 | 50 |
| NOx mg/m$^3$ @ 8% O$_2$ | 1765 | 1270 | 295 | 295 |
| CO mg/m$^3$ @ 8% O$_2$ | 16 | 1660 | 2410 | 215 |

Column 1 shows the base line conditions with NOx emissions at an average of 1785 mg/m$^3$ measured at the exit port mouth. The average excess air at the port mouth was 24%. The corresponding NOx emission at the chimney was 1765 mg/m$^3$. The excess air was reduced to 0% effectively stoichiometric, in preparation for the addition of natural gas into the waste gas stream in the exit port mouths via after burners. Under stoichiometric conditions the NOx emission measured at the port mouth fell to 1300 mg/m$^3$ (1270 mg/m$^3$ at the chimney).

Natural gas, via the after burners, was added to the waste gas streams of all four ports, in stages up to a level of 8.6% of the fossil fuel energy supplied to the melting furnace.

Results showed that in this application the level of after burner fuel required were:

4% for initiation of deNOx

6% for significant reductions in NOx

8% to achieve <500 mg/m$^3$.

Natural gas, with a total supply to the furnace waste gases of 123 m$^3$/hr, was fed through side port gas burners., which acted as the after burners.

Using the after burners, the NOx levels in the port mouth fell to an average of 1175 mg/m$^3$, but at the chimney, due to the reduction of NOx in the sealed regenerator, the emission of NOx was reduced to <500 mg/m$^3$. Some de-NOX was also occurring in the upper chamber of the regenerator at this time the level of NOx at the checker top was 865 mg/m$^3$.

As can be seen from the table, during the moves described in columns 1 to 3 of the table, CO emissions rose steadily. CO emissions were 1200 ppm when the furnace excess air levels were reduced toward stoichiometric.

As fuel was added through the after burners, the level of CO at the chimney rose to 1830 ppm. In an attempt to remove the CO from the waste gases, controlled amounts of cold air were introduced into the regenerator base. However, the temperatures in the regenerator base were insufficient to give the required level of deCO, with only marginal reductions to 1200 ppm with this method.

The introduction of a high excess air burner, supplying hot air at about 900° C., with a burner fuel supply at 4% of the melting furnace consumption (excluding the boost), raised the temperature of the waste gas in the regenerator base. Because of the limited residence time in the small flue system, the required burnout temperature of around 650° C. was extended into the main flue so that the required level of deCO could be achieved. Under these conditions the temperatures in the regenerator base rose to around 800° C. and emission of CO fell to 165 ppm.

During all of these modifications to the furnace operation for NOx reduction glass quality and color was consistently maintained.

The processes of the present invention are believed to be applicable to all container glass furnaces. It is our belief that the quality of the glass produced is not adversely affected by utilizing the process of the present invention.

Although methods of the present invention have been shown to reduce NOx emissions to low levels, even below 500 mg/m$^3$ this has only been achieved on an experimetal test basis.

It will be apparent that there is no standardized definition of the quality of shaped glass. Different manufacturers and end users will have different quality requirements for their products. The use of the processes of the present invention will, it is believed, have no adverse effect on any such quality requirements.

What is claimed is:

1. A method of operating a regenerative glass furnace for melting glass for the manufacture of shaped glass articles so as to minimize emission of NOx in waste gases leaving the furnace, the furnace including a melting chamber and including sealed regenerators which act as heat exchangers, the method comprising melting glass in the melting chamber, to which fuel and combustion air are supplied, under substantially stoichiometric conditions, and supplying excess fuel to the waste gases as they leave the melting chamber and enter the sealed regenerators such that waste gases in the sealed regenerators contain combustible material available to react with NOx in the waste gases, and thereafter reacting said combustible material with sufficient air to ensure that the waste gases leaving the furnace through the regenerators and exiting to atmosphere contain permissible levels of combustible material and contain permissible levels of NOx.

2. A method according to claim 1 wherein the excess fuel supplied to the waste gases is in an amount greater than at least 3% of the amount of fuel supplied to the melting chamber.

3. A method according to claim 2 wherein the excess fuel supplied to the waste gases is in an amount in the range from 8 to 10% of the amount of fuel supplied to the melting chamber.

4. A method according to claim 1 wherein the excess fuel is supplied to the waste gases by additional burners located in port mouths of the furnace.

5. A method according to claim 1 wherein the excess fuel is supplied to the waste gases by burners which, in a reverse cycle, supply fuel to the melting chamber of the furnace.

6. A method according to claim 1 wherein the regenerators include a checkerwork structure and excess air is permitted to enter the regenerators downstream of the checkerwork structure so as to ensure substantially complete combustion of the fuel in excess of that required for stoichiometric combustion in the waste gases.

7. A method according to claim 1 wherein the NOx emissions in the waste gases exiting to atmosphere are less than 500 mg/m$^3$ measured under TALuft conditions.

8. A method according to claim 1 wherein the regenerators include a checkerwork structure and further comprising removing CO from the waste gases in the regenerators by combusting CO downstream of the checkerwork structure in the regenerators at a temperature of greater than about 650° C.

9. A method according to claim 8 wherein air is present downstream of the checkerwork structure in an amount sufficient to cause substantially complete combustion of the CO.

10. A method according to claim 8 air is supplied into the regenerator beneath the checkerwork structure.

11. A method according to claim 8 wherein CO emissions in the waste gases exiting to atmosphere are less than 300 mg/m$^3$ measured under TALuft conditions.

* * * * *